United States Patent
Kota

(10) Patent No.: US 8,856,934 B2
(45) Date of Patent: Oct. 7, 2014

(54) IMAGE FORMING APPARATUS, INPUT CONTROL METHOD, INPUT CONTROL PROGRAM, AND STORAGE MEDIUM

(75) Inventor: Noriko Kota, Tokyo (JP)

(73) Assignee: Ricoh Company, Limited, Toyko (JP)

( * ) Notice: Subject to any disclaimer, the term of this patent is extended or adjusted under 35 U.S.C. 154(b) by 203 days.

(21) Appl. No.: 12/929,491

(22) Filed: Jan. 28, 2011

(65) Prior Publication Data

US 2011/0191839 A1    Aug. 4, 2011

(30) Foreign Application Priority Data

Feb. 2, 2010 (JP) ................................ 2010-021597
Nov. 17, 2010 (JP) ................................ 2010-256625

(51) Int. Cl.
*G06F 21/00* (2013.01)
*H04L 9/32* (2006.01)

(52) U.S. Cl.
CPC ........................ *H04L 9/32* (2013.01)
USPC ...... 726/25; 726/5; 726/7; 713/168; 713/176; 455/411

(58) Field of Classification Search
USPC .................................. 726/7, 16, 25
See application file for complete search history.

(56) References Cited

U.S. PATENT DOCUMENTS

| | | | |
|---|---|---|---|
| 8,390,838 B2 | 3/2013 | Sawada et al. | |
| 2003/0054800 A1* | 3/2003 | Miyashita | 455/411 |
| 2003/0097593 A1* | 5/2003 | Sawa et al. | 713/201 |
| 2003/0142952 A1 | 7/2003 | Oka et al. | |
| 2004/0049684 A1* | 3/2004 | Nomura et al. | 713/182 |
| 2005/0071635 A1* | 3/2005 | Furuyama | 713/168 |
| 2005/0183141 A1* | 8/2005 | Sawada | 726/16 |
| 2005/0213149 A1* | 9/2005 | Kuwahara | 358/1.15 |
| 2006/0103875 A1* | 5/2006 | Aoki et al. | 358/1.15 |
| 2007/0204164 A1* | 8/2007 | Cattrone et al. | 713/176 |
| 2008/0104403 A1* | 5/2008 | Gueron | 713/176 |
| 2008/0189775 A1* | 8/2008 | Fujita | 726/7 |

(Continued)

FOREIGN PATENT DOCUMENTS

| | | |
|---|---|---|
| CA | 2076466 | 4/1993 |
| CN | 1074768 | 7/1993 |

(Continued)

OTHER PUBLICATIONS

Chinese Office Action dated May 30, 2013 issued in corresponding Chinese Application No. 201110034930.

(Continued)

*Primary Examiner* — Morshed Mehedi
(74) *Attorney, Agent, or Firm* — Harness, Dickey & Pierce

(57) ABSTRACT

Inputs from multiple input devices including an internal input device 22, a first external input device 54, and a second external input device 56 can be made to a printing apparatus 20. The printing apparatus 20 includes a receiver 50 that receives, from a host device, a print job containing print user identification information that identifies a print user; an input controller 42 that controls any one of the multiple input devices to serve as an input device that inputs authentication information that is used for authenticating the print user identification information; an authentication information input accepting unit 44 that accepts an input of the authentication information from the controlled input device; an authentication unit 46 that authenticates the print user identification information using the accepted authentication information; and a printing unit 52 that performs printing according to the print job when the authentication is successful.

20 Claims, 13 Drawing Sheets

(56) References Cited

U.S. PATENT DOCUMENTS

| | | | |
|---|---|---|---|
| 2009/0158422 A1* | 6/2009 | Tomiyasu et al. | 726/17 |
| 2010/0009658 A1* | 1/2010 | Wu et al. | 455/411 |
| 2010/0031346 A1* | 2/2010 | Kano | 726/19 |
| 2010/0319057 A1* | 12/2010 | Murai et al. | 726/5 |

FOREIGN PATENT DOCUMENTS

| | | |
|---|---|---|
| CN | 1612081 | 5/2005 |
| CN | 1672949 | 9/2005 |
| CN | 101226463 | 7/2008 |
| JP | 2003224738 A | 8/2003 |
| JP | 2004295632 A | 10/2004 |
| JP | 2007267369 A | 10/2007 |
| JP | 2008003782 A | 1/2008 |
| JP | 2009248539 A | 10/2009 |
| WO | WO-2007066480 A1 | 6/2007 |

OTHER PUBLICATIONS

Office Action for corresponding Japanese Application No. 2010-256625 dated Jul. 8, 2014.

* cited by examiner

FIG. 2

| EXTERNAL INPUT DEVICE TYPE | PRODUCT ID | VENDER ID | DEVICE RELEASE NUMBER |
|---|---|---|---|
| FIRST EXTERNAL INPUT DEVICE | 1234 | BA09 | 90AB |
| SECOND EXTERNAL INPUT DEVICE | CDEF | BA09 | 8765 |

FIG. 3

| INPUT DEVICE TYPE | INPUT ALLOWABILITY INFORMATION | PRIORITY LEVEL |
|---|---|---|
| FIRST EXTERNAL INPUT DEVICE | ALLOWED | 2 |
| SECOND EXTERNAL INPUT DEVICE | ALLOWED | 1 |
| INTERNAL INPUT DEVICE | NOT ALLOWED | 3 |

FIG. 11

| INPUT DEVICE TYPE | INPUT ALLOWABILITY INFORMATION | PRIORITY LEVEL | NUMBER OF TIMES DEVICE IS USED |
|---|---|---|---|
| FIRST EXTERNAL INPUT DEVICE | ALLOWED | 2 | 90 |
| SECOND EXTERNAL INPUT DEVICE | ALLOWED | 1 | 100 |
| INTERNAL INPUT DEVICE | NOT ALLOWED | 3 | 0 |

FIG. 12

| INPUT DEVICE TYPE | INPUT ALLOWABILITY INFORMATION | PRIORITY LEVEL | NUMBER OF TIMES DEVICE IS USED | SWITCHING ALLOWABILITY INFORMATION |
|---|---|---|---|---|
| FIRST EXTERNAL INPUT DEVICE | ALLOWED | 2 | 90 | ALLOWED |
| SECOND EXTERNAL INPUT DEVICE | ALLOWED | 1 | 100 | NOT ALLOWED |
| INTERNAL INPUT DEVICE | NOT ALLOWED | 3 | 0 | ALLOWED |

FIG. 14

| INPUT DEVICE TYPE | INPUT ALLOWABILITY INFORMATION | PRIORITY LEVEL | VERSION INFORMATION |
|---|---|---|---|
| FIRST EXTERNAL INPUT DEVICE | ALLOWED | 2 | 2007.07 |
| SECOND EXTERNAL INPUT DEVICE | ALLOWED | 1 | 2008.01 |
| INTERNAL INPUT DEVICE | NOT ALLOWED | 3 | 2006.03 |

FIG. 15

| INPUT DEVICE TYPE | INPUT ALLOWABILITY INFORMATION | PRIORITY LEVEL | VERSION INFORMATION | SWITCHING ALLOWABILITY INFORMATION |
|---|---|---|---|---|
| FIRST EXTERNAL INPUT DEVICE | ALLOWED | 2 | 2007.07 | ALLOWED |
| SECOND EXTERNAL INPUT DEVICE | ALLOWED | 1 | 2008.01 | NOT ALLOWED |
| INTERNAL INPUT DEVICE | NOT ALLOWED | 3 | 2006.03 | ALLOWED |

IMAGE FORMING APPARATUS, INPUT CONTROL METHOD, INPUT CONTROL PROGRAM, AND STORAGE MEDIUM

CROSS-REFERENCE TO RELATED APPLICATIONS

The present application claims priority to and incorporates by reference the entire contents of Japanese Patent Application No. 2010-021597 filed in Japan on Feb. 2, 2010 and Japanese Patent Application No. 2010-256625 filed in Japan on Nov. 17, 2010.

BACKGROUND OF THE INVENTION

1. Field of the Invention

The present invention relates to an image forming apparatus, an input control method, an input control program, and a storage medium.

2. Description of the Related Art

With increasing security consciousness, technologies are widely used in which a print job sent from a computer, such as a personal computer, to an image forming apparatus, such as a multifunctional machine, is authenticated and, if the authentication is successful in the image forming apparatus, printing is performed using the print job.

For example, Japanese Patent Application Laid-open No. 2008-003782 discloses a technology in which management information is generated from serial numbers that are read from an external USB (universal serial bus) memory that is externally attached to a multifunctional machine and then authentication is performed using the generated management information. Normally, input devices (for example, a soft keyboard using a touch panel) included in image forming apparatuses as standard do not have excellent input performance. If an external input device can make inputs as disclosed in the Japanese Patent Application, the input performance improves.

If inputs from multiple input devices can be made, multiple users can simultaneously input authentication information that is used for authentication. However, this situation is not preferable.

The present invention is made in view of the above-described problem. Objectives of the present invention is to provide an image forming apparatus to which inputs of authentication information from multiple input devices can be made while conflict of inputs of the authentication information can be prevented and to provide an input control method, an input control program, and a storage medium.

SUMMARY OF THE INVENTION

It is an object of the present invention to at least partially solve the problems in the conventional technology.

One aspect of the invention is directed to an image forming apparatus to which inputs from multiple input devices can be made. The multiple input devices include a built-in input device and at least one external input device. The image forming apparatus comprises a receiver that receives, from a host device, a print job containing print user identification information that identifies a print user; an input controller that controls any one of the multiple input devices to serve as an input device that inputs authentication information that is used for authenticating the print user identification information; an authentication information input accepting unit that accepts an input of the authentication information from the controlled input device; an authentication unit that authenticates the print user identification information using the accepted authentication information; and a printing unit that performs printing according to the print job when the authentication is successful.

Another aspect of the invention relates to an input control method that is performed by an image forming apparatus to which inputs from multiple input devices can be made. The multiple input devices include a built-in input device and at least one external input device. The input control method comprises receiving, from a host device by a receiver, a print job containing print user identification information that identifies a print user; controlling, by an input controller, any one of the multiple input devices to serve as an input device that inputs authentication information that is used for authenticating the print user identification information; accepting, by an authentication information input accepting unit, an input of the authentication information from the controlled input device; authenticating, by an authentication unit, the print user identification information using the accepted authentication information; and performing, by a printing unit, printing according to the print job when the authentication is successful.

Still another aspect of the invention relates to a computer program product. The program product has a program including instructions for performing an image forming apparatus to which inputs from multiple input devices can be made. The multiple input devices include a built-in input device and at least one external input device. The instructions comprises receiving, from a host device by a receiver, a print job containing print user identification information that identifies a print user; controlling, by an input controller, any one of the multiple input devices to serve as an input device that inputs authentication information that is used for authenticating the print user identification information; accepting, by an authentication information input accepting unit, an input of the authentication information from the controlled input device; authenticating, by an authentication unit, the print user identification information using the accepted authentication information; and performing, by a printing unit, printing according to the print job when the authentication is successful.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a table of an example of an external input device identification table.

FIG. 3 is a table of an example of information that is stored in an input allowability information storage unit.

FIG. 11 is a table of an example of information that is stored in an input allowability information storage unit of Modification 1.

FIG. 12 is a table of an example of information that is stored in an input allowability information storage unit of Modification 2.

FIG. 14 is a table of an example of information that is stored in an input allowability information storage unit of Modification 3.

FIG. 15 is a table of an example of information that is stored in an input allowability information storage unit of Modification 4.

DETAILED DESCRIPTION OF THE PREFERRED EMBODIMENTS

Embodiments of an image forming apparatus, an input control method, an input control program, and a storage medium according to the present invention will be described in detail below with reference to the accompanying drawings. In the following embodiments, a printing apparatus is taken as an example of an image forming apparatus. However, the present invention is not limited to this. For example, an image forming apparatus can be a multifunction peripheral (MFP) that includes any one of a copy function, scanner function, and facsimile function, in addition to a printing function.

First Embodiment

In a first embodiment of the present invention, an example will be described in which an input device that starts an input first is controlled to serve as an input device that inputs authentication information.

A configuration of a printing system that includes a printing apparatus according to the first embodiment will be described below.

Figure 1:
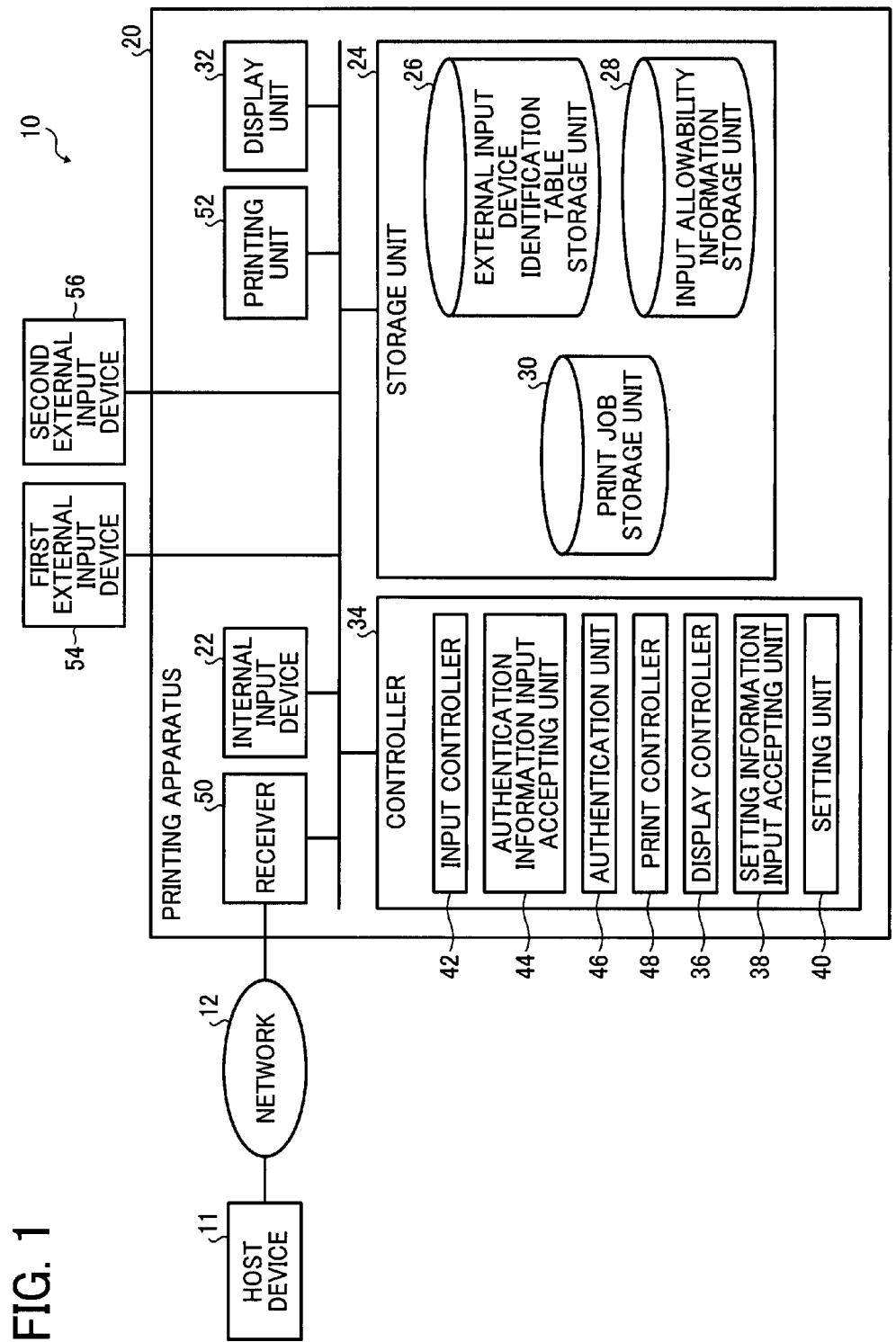
FIG. 1 is a block diagram of a configuration example of a printing system that includes a printing apparatus of a first embodiment of the present invention.

FIG. 1 is a block diagram of an example of a configuration of a printing system 10 that includes a printing apparatus 20 of the first embodiment. As illustrated in FIG. 1, the printing system 10 includes the printing apparatus 20 and a host device 11 that instructs the printing apparatus 20 to perform printing. The printing apparatus 20 and the host device 11 are connected via a network 12. The network 12 may be realized using, for example, a wired or wireless LAN (local area network). The host device 11 and the printing apparatus 20 may be connected via an USB (universal serial bus).

The host device 11 generates a print job that contains image data of an image to be printed, a print instruction, and print user identification information (for example, a user ID of a user who performs printing (hereinafter, "print user")) that identifies a print user. The host device 11 sends the generated print job to the printing apparatus 20. The host device 11 can be realized using a conventional computer, such as a PC (personal computer). The print instruction is described in a PDL (page description language).

As illustrated in FIG. 1, the printing apparatus 20 includes an internal input device 22, a storage unit 24, a display unit 32, a controller 34, a receiver 50, and a printing unit 52. A first external input device 54 and a second external input device 56 are externally attached to the printing apparatus 20.

The internal input device 22 is an input device that is incorporated or built-in in the printing apparatus 20 (that the printing apparatus 20 includes). The internal input device 22 provides various inputs, such as an input of authentication information that is used for authenticating print user identification information. The internal input device 22 can be realized using a conventional input device, such as a touch panel or a key switch.

The first external input device 54 and the second external input device 56 are input devices that are externally attached to the printing apparatus 20. The first external input device 54 and the second external input device 56 provide various inputs, such as an input of authentication information that is used for authenticating print user identification information. The first external input device 54 and the second external input device 56 may be realized using, for example, a keyboard or a card reader that can be externally attached using an USB. In the first embodiment, an example is described in which the first external input device 54 is a keyboard and the second external input device 56 is a card reader. However, the present invention is not limited to this. In the first embodiment, an example will be explained in which two external input devices are used. However, the present invention is not limited to this. It is satisfied if at least one external input device is used.

The storage unit 24 stores various programs that are executed by the printing apparatus 20 and various types of information that are used for various processes that are performed by the printing apparatus 20. The storage unit 24 may be realized using a conventional storage device that stores data magnetically, optically, or electrically, such as an HDD (hard disk drive), an SDD (solid state drive), a memory card, an optical disk, a ROM (read only memory), or a RAM (random access memory). The storage unit 24 includes an external input device identification table storage unit 26, an input allowability information storage unit 28, and a print job storage unit 30.

The external input device identification table storage unit 26 stores an external input device identification table that defines identification information regarding external input devices that are usable in the printing apparatus 20. FIG. 2 is a table of an example of an. external input device identification table. In the example illustrated in FIG. 2, the external input device identification table associates a product ID, a vender ID, and a device release number with each external input device usable in the printing apparatus 20 and defines them as identification information. In the first embodiment, when an external input device is externally attached to the printing apparatus 20, the printing apparatus 20 is notified of the identification information (the product ID, the vender ID, and the device release number) on the externally-attached external input device. The controller 34, which is described below, then refers to the external input device identification table in FIG. 2 and confirms that the externally-attached external input device is an external input device that is usable in the printing apparatus 20.

The input allowability information storage unit 28 stores input allowability information that represents either that each of the multiple input devices is allowed to provide an input or that it is not allowed to do so. FIG. 3 is a table of an example of information that is stored in the input allowability information storage unit 28. In the example illustrated in FIG. 3, the input allowability information storage unit 28 associates for storage input allowability information and the priority level with each of the multiple input devices that are used by the printing apparatus 20. The input allowability information regarding each of the first external input device 54 and the second external input device 56 is set to represent that an input is allowed, and the input allowability information regarding the internal input device 22 is set to represent that an input is not allowed. The priority levels are in the order of the second external input device 56, the first external input device 54, and the internal input device 22.

A detailed description of the print job storage unit 30 will be described below.

The display unit 32 displays various screens, such as a setting screen for setting an external input device that is actually used by the printing apparatus 20 or a setting screen for setting input allowability and the priority level of each of the multiple input devices that are used by the printing apparatus 20. The display unit 32 may be realized using a conventional display device, such as a touch panel display or a liquid crystal display. The display unit 32 and the internal input device 22 may be integrally realized using a touch panel display.

The controller 34 controls each element of the printing apparatus 20. The controller 34 may be realized using a conventional control device, such as a CPU (central processing unit). The controller 34 includes a display controller 36, a setting information input accepting unit 38, a setting unit 40, an input controller 42, an authentication information input accepting unit 44, an authentication unit 46, and a print controller 48.

The display controller 36 refers to the external input device identification table storage unit 26 and causes the display unit 32, from the external input devices defined by the external input device identification table, to display a setting screen for setting an external input device that is actually used by the printing apparatus 20, or a setting screen for setting input allowability and the priority level of each of the multiple input devices that are used by the printing apparatus 20.

The setting information input accepting unit 38 accepts an input of setting information for setting input allowability of any one of the multiple input devices, from any one of the input devices showing that the input allowability information represents that an input is allowed. For example, in the case illustrated in FIG. 3, when the display unit 32 displays a setting screen, the setting information input accepting unit 38 accepts an input, from the first external input device 54, of setting information for setting an external input device that is actually used by the printing apparatus 20 or an input of setting information for setting input allowability and the priority level of any one of the multiple input devices used by the printing apparatus 20.

The setting unit 40 sets the input allowability represented by the input allowability information according to the setting information that is accepted by the setting information input accepting unit 38. For example, when the setting information input accepting unit 38 accepts setting information for setting an external input device that is actually used by the printing apparatus 20, the setting unit 40 adds and stores the input allowability information and the priority level of the external input device in the input allowability information storage unit 28. For example, when the setting information input accepting unit 38 accepts setting information for setting input allowability and the priority level of the input device of any one of the input devices used in the printing apparatus 20, the setting unit 40 updates the input allowability information and the priority level of the input device, which are stored in the input allowability information storage unit 28, according to the accepted setting information.

A detailed description will be given below for the input controller 42, the authentication information input accepting unit 44, the authentication unit 46, and the print controller 48.

The receiver 50 communicates with external devices, such as the host device 11, via the network 12. The receiver 50 may be realized using a conventional communication device, such as a communication interface. The receiver 50 receives, for example, a print job that contains print user identification information for identifying a print user from the host device 11.

The print job storage unit 30 will be described here. In response to an instruction from the controller 34, the print job storage unit 30 stores a print job that is received by the receiver 50.

In response to an instruction from the controller 34, the printing unit 52 prints image data to be printed according to the print job that is stored in the print job storage unit 30.

The print controller 42, the authentication information input accepting unit 44, the authentication unit 46, and the print controller 48 will be described here.

The input controller 42 controls any one of the multiple input devices to serve as an input device that inputs authentication information. Specifically, after the print job is received by the receiver 50, out of the input devices showing that the input allowability information represents that an input is allowed, the input controller 42 sets the input allowability information regarding the input devices other than the input device that has started providing an input first to represent that an input is not allowed.

The authentication information input accepting unit 44 accepts an input of authentication information (for example, the user ID of the print user) from the input device that is controlled by the input controller 42. Specifically, the authentication information input accepting unit 44 accepts an input of authentication information from the input device regarding which the input allowability information is set to represent that an input is allowed, and the authentication information input accepting unit 44 then discards inputs from of authentication information from input devices regarding which input allowability information is set to represent that an input is not allowed.

The authentication unit 46 authenticates the print user identification information using the authentication information that is accepted by the authentication information input accepting unit 44. For example, when the authentication information and the print user identification information match, the authentication unit 46 determines that the authentication is successful. When the authentication information and the print user identification information do not match, the authentication unit 46 determines that the authentication fails.

When the authentication by the authentication unit 46 is successful, the print controller 48 causes the printing unit 52 to print the image data to be printed according to the print job that is stored in the print job storage unit 30.

The printing apparatus 20 is not necessarily configured to include all the above-described elements, and thus the elements may be partly omitted.

The operations of the printing apparatus of the first embodiment will be described here.

Figure 4:
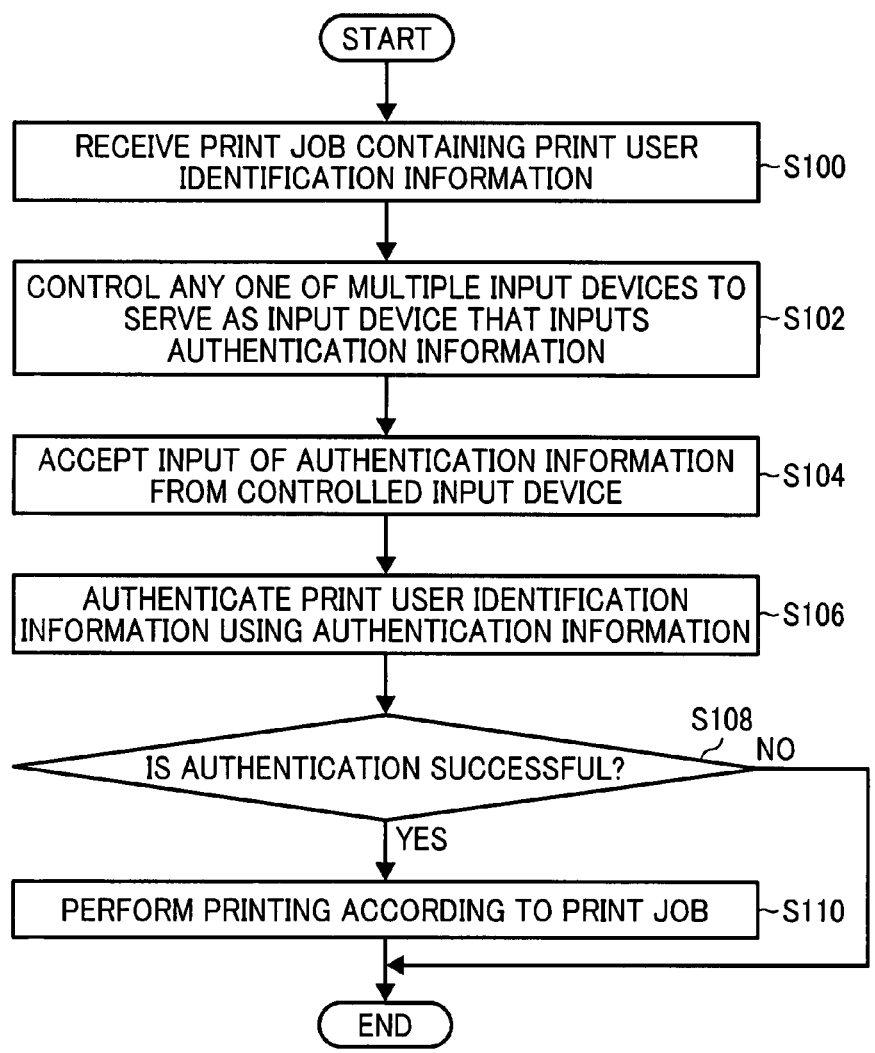
FIG. 4 is a flowchart of an example of a printing process that is performed by the printing apparatus of the first embodiment.

FIG. 4 is a flowchart of an example of the flow of the procedure of the printing process that is performed by the printing apparatus 20 of the first embodiment.

First, the receiver 50 receives a print job that contains print user identification information that identifies a print user from the host device 11 (step S100). In response to an instruction from the controller 34, the print job storage unit 30 temporarily stores the print job that is received by the receiver 50.

The input controller 42 then control any one of the multiple input devices (the internal input device 22, the first external input device 54, and the second external input device 56) to serve as an input device that inputs authentication information that is used to authenticate the print user identification information (step S102).

The authentication information input accepting unit 44 accepts an input of authentication information from the input device that is controlled by the input controller 42 (step S104).

The authentication unit 46 authenticates the print user identification information using the authentication information that is accepted by the authentication information input accepting unit 44 (step S106).

When the authentication by the authentication unit 46 is successful (YES at step S108), the print controller 48 instructs the printing unit 52 to perform printing. Accordingly, the printing unit 52 prints the image data to be printed according to the print job that is stored in the print job storage unit 30 (step S110).

In contrast, when the authentication by the authentication unit 46 fails (NO at step S108), the print controller 48 do not instruct the printing unit 52 to perform printing and thus the printing unit 52 does not perform printing.

Figure 5:
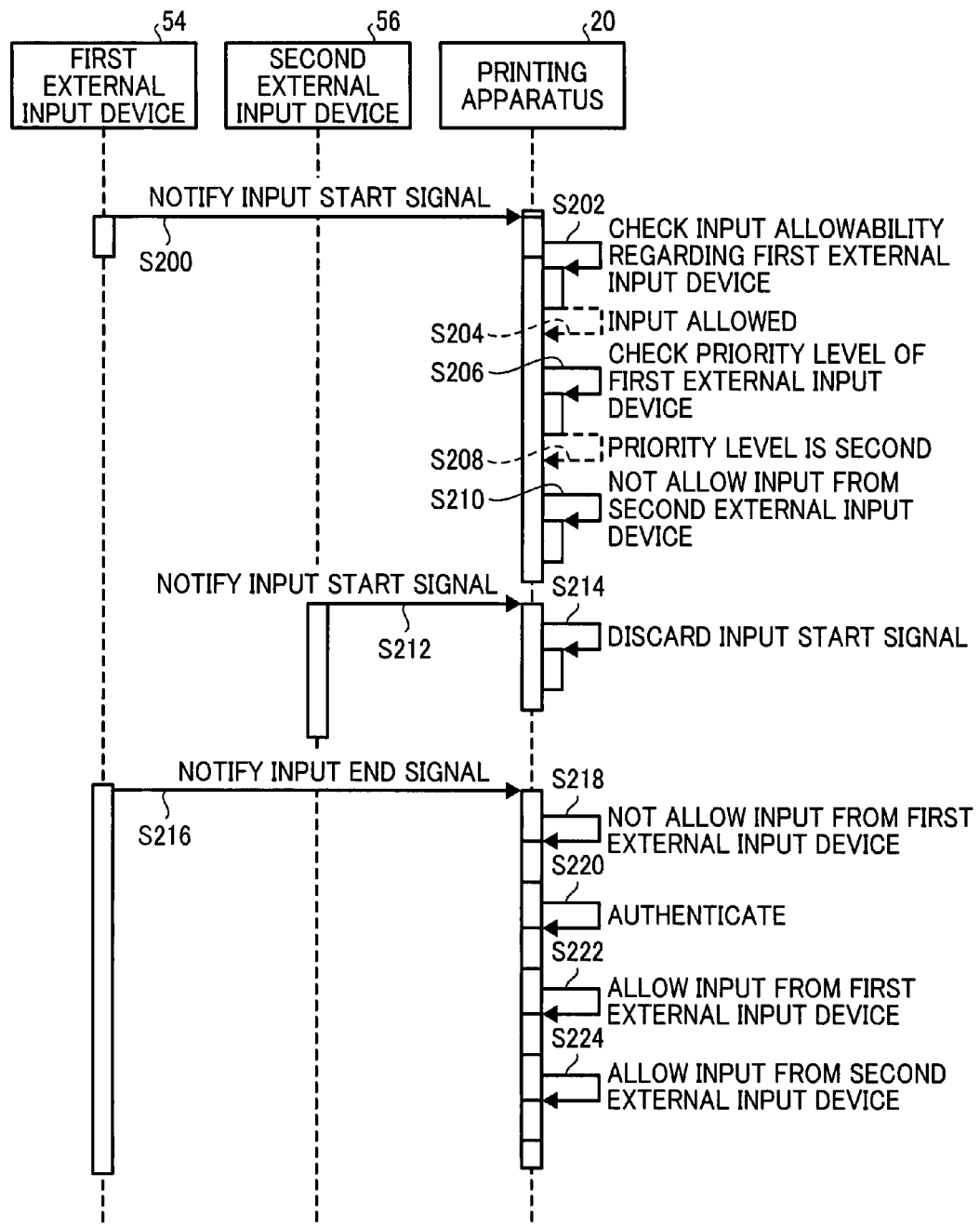
FIG. 5 is a sequence chart of a specific example of control on inputs of authentication information, which is control performed by the printing apparatus of the first embodiment.

FIG. 5 is a sequence chart of a specific example of input control of authentication information, which is performed by the printing apparatus 20 of the first embodiment. The sequence chart in FIG. 5 illustrates the specific example of operations of the printing apparatus 20 after the receiver 50 receives a print job. The input allowability information storage unit 28 stores the information in FIG. 3.

First, upon starting an input of the authentication information, the first external input device 54 notifies the printing apparatus 20 of an input start signal (step S200).

The input controller 42 then checks the input allowability represented by the input allowability information regarding the first external input device 54, which is stored in the input allowability information storage unit 28 (step S202), and confirms that the input allowability information is set to represent that an input is allowed (step S204). Accordingly, the authentication information input accepting unit 44 accepts the input start signal that is notified by the first external input device 54.

The input controller 42 then checks the priority level of the first external input device 54 stored in the input allowability information storage unit 28 (step S206) and confirms that the priority level is the second (step S208).

After the print job is received by the receiver 50, out of the input devices (the first external input device 54 and the second external input device 56) showing that the input allowability information represents that an input is allowed, the input controller 42 sets the input allowability information regarding the input devices other than the first external input device 54 that has started providing an input first, i.e., the second external input device 56 to represent that an input is not allowed (step S210).

Once the second external input device 56 starts inputting the authentication information, the second external input device 56 notifies the printing apparatus 20 of an input start signal (step S212). However, because the input allowability information regarding the second external input device 56 is set to represent that the input is not allowed, the authentication information input accepting unit 44 discards the input start signal that is notified by the second external input device 56 (step S214). Meanwhile, the first external input device 54 is inputting the authentication information.

Once the first external input device 54 finishes inputting the authentication information, the first external input device 54 notifies the printing apparatus 20 of an input end signal and the authentication information input accepting unit 44 accepts the input end signal (step S216).

Once the authentication information input accepting unit 44 accepts the input end signal, the input controller 42 sets the input allowability information regarding the first external input device 54, which is stored in the input allowability information storage unit 28, such that the set input allowability information represents that an input is not allowed (step S218).

The authentication unit 46 then authenticates the print user identification information using the authentication information that is accepted by the authentication information input accepting unit 44 (step S220).

Once the authentication by the authentication unit 46 finishes, regardless of the authentication result, the input controller 42 sets the input allowability information regarding the first external input device 54, which is stored in the input allowability information storage unit 28, such that the set input allowability information represents that an input is allowed (step S222) and sets the input allowability information regarding the second external input device 56 to represent that an input is allowed (step S224).

As described above, according to the first embodiment, out of the multiple input devices that can input authentication information, an input device that starts inputting authentication information first is controlled to serve as an input device that input authentication information; therefore, while multiple input devices can input authentication information, conflict of inputs of the authentication information can be prevented. Particularly, in the first embodiment, conflict of inputs of the authentication information can be prevented automatically without awareness of print users. Furthermore, in the first embodiment, the print users and the manager can set multiple input devices that can input authentication information. This increases the convenience.

Second Embodiment

In a second embodiment of the present invention, an example will be described in which an input device that inputs authentication information is controlled according to the priority level of an input device that starts an input. The difference between the first embodiment and the second embodiment will be mainly described below and elements having the same functions as those of the first embodiment are denoted by the same name and reference numerals as those of the first embodiment, and the same descriptions will be omitted.

Figure 6:
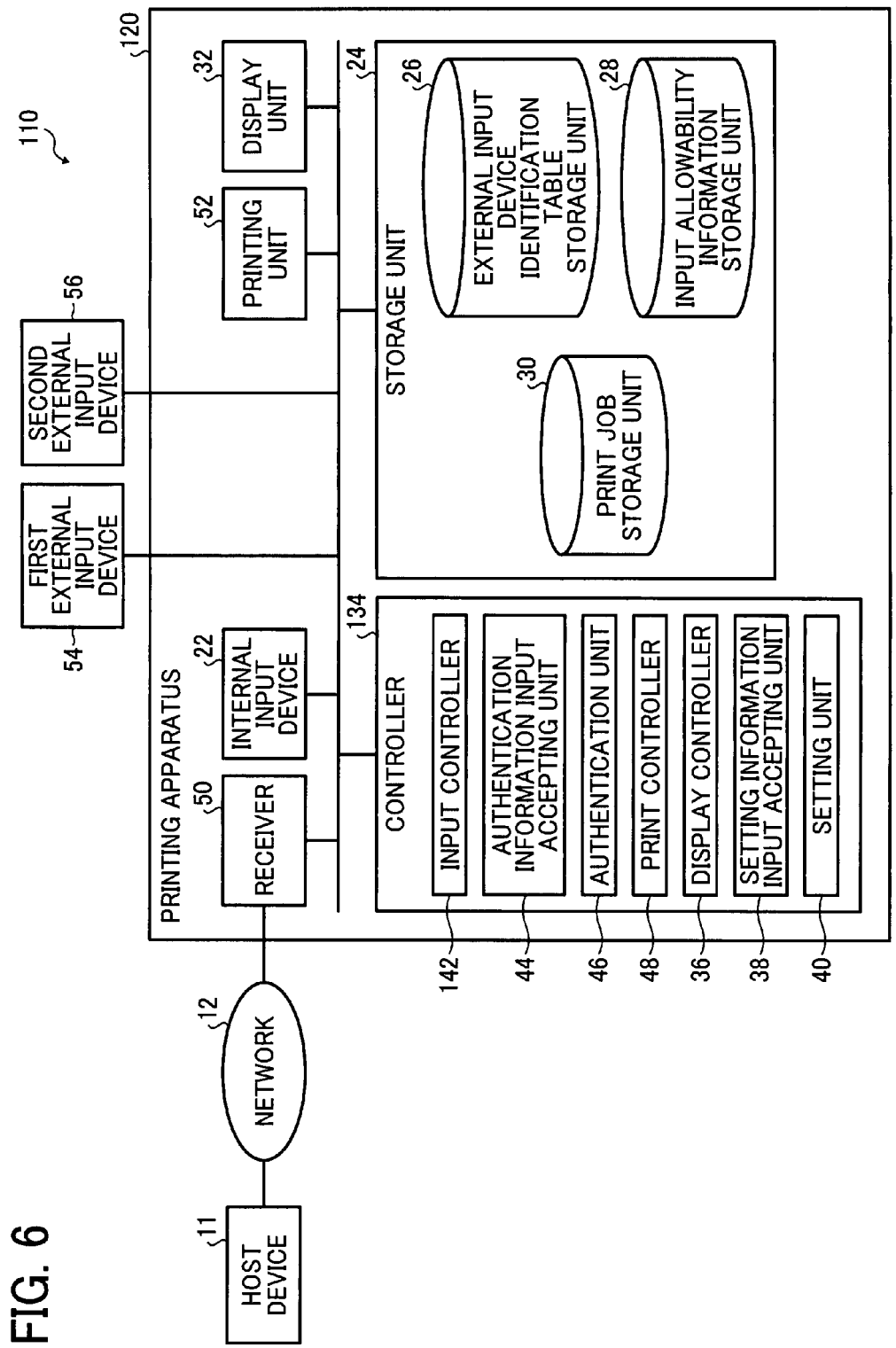
FIG. 6 is a block diagram of a configuration example of a printing system that includes a printing apparatus of a second embodiment of the present invention.

FIG. 6 is a block diagram of an example of a configuration of a printing system 110 that includes a printing apparatus 120 of the second embodiment. In the second embodiment, the contents of processes of an input controller 142 of a controller 134 are different from those of the printing apparatus 20 of the first embodiment. The input controller 142 will be described below.

Each time an input is started after the receiver 50 receives a print job, the input controller 142 sets input allowability information regarding an input device whose priority level is lower than that of another input device that starts the input, out of input devices regarding which the input allowability information represents that an input is allowed, such that the set input allowability information represents that an input is not allowed.

Figure 7:
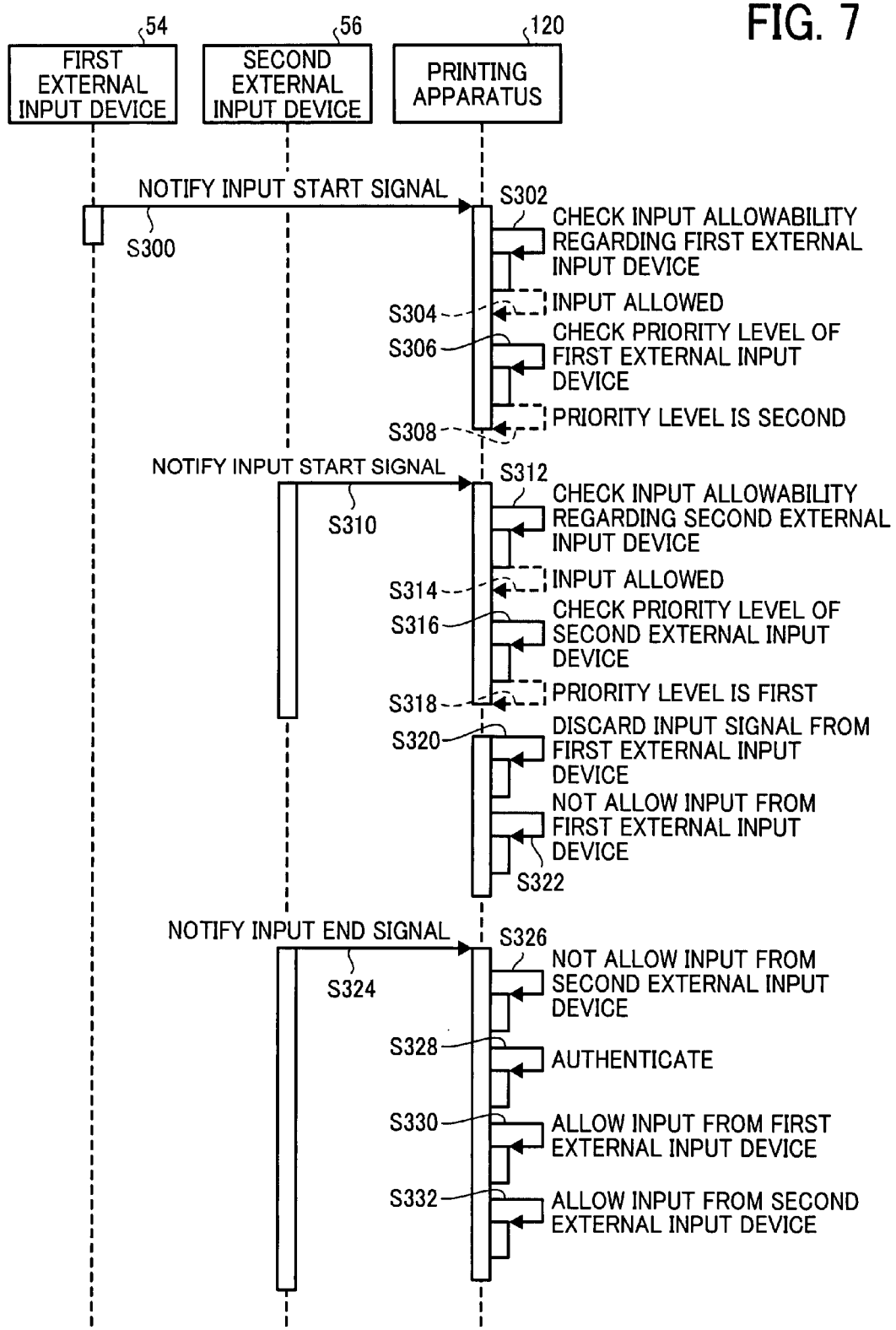
FIG. 7 is a sequence chart of an specific example of control on inputs of authentication information, which is control performed by the printing apparatus according to the second embodiment.

FIG. 7 is a sequence chart of an example of a specific example of control on inputs of authentication information, which is control performed by the printing apparatus 120 of the second embodiment. The sequence chart of FIG. 7 illustrates the specific example of operations of the printing apparatus 120 after the receiver 50 receives a print job. The input allowability information storage unit 28 stores the information illustrated in FIG. 3. The printing process performed by the printing apparatus 120 is similar to that of the first embodiment and thus a description thereof will be omitted below.

The process of steps S300 to S308 is similar to that of steps S200 to S208 in the sequence chart of FIG. 5. Among the input devices regarding which the input allowability information represents that an input is allowed (the first external input device 54 and the second external input device 56), there is no input device whose priority level is lower than the priority level of the first external input device 54 that starts the input; therefore, the input controller 142 does not perform setting on the input allowability information.

Once the second external input device 56 starts an input of the authentication information, the second external input device 56 notifies the printing apparatus 20 of an input start signal (step S310).

The input controller 142 then checks the input allowability represented by the input allowability information regarding the second external input device 56, which is stored in the input allowability information storage unit 28 (step S312), and confirms that the input allowability information is set to represent that an input is allowed (step S314). Accordingly, the authentication information input accepting unit 44 accepts the input start signal that is notified by the second external input device 56.

The input controller 142 then checks the priority level of the second external input device 56 stored in the input allowability information storage unit 28 (step S316) and confirms that the priority level is the first (step S318).

The authentication information input accepting unit 44 then discards the input start signal that is notified by the first external input device 54 (step S320). The input controller 142 then sets the input allowability information regarding the input device whose priority level is lower than the priority level of the second external input device 56 that starts the input, out of the input devices (the first external input device 54 and the second external input device 56) regarding which the input allowability information represents that an input is allowed, such that the set input allowability information represents that an input is not allowed, i.e., sets the input allowability information regarding the first external input device 54 to represent that an input is not allowed (step S322).

Once the second external input device 56 finishes inputting the authentication information, the second external input device 56 notifies the printing apparatus 120 of an input end signal and the authentication information input accepting unit 44 accepts the input end signal (step S324).

Once the authentication information input accepting unit 44 accepts the input end signal, the input controller 142 sets the input allowability information regarding the second external input device 56, which is stored in the input allowability information storage unit 28, such that the input allowability information regarding the second external input device 56 represents that an input is not allowed (step S326).

The process of steps S328 to S332 is similar to that of steps S220 to S224 in the sequence chart of FIG. 5.

As described above, according to the second embodiment, each time an input is provided, an input device whose priority level is lower than the priority level of another input device that has provided an input is controlled to represent that an input is not allowed; therefore, while multiple input devices can input authentication information, conflict of inputs of the authentication information can be prevented. Particularly, in the second embodiment, even if authentication information from an input device is input after another input device has provided its authentication information, the authentication information from the former can be input by priority if the priority level of the former is higher than the priority level of the latter. As a result, conflict of inputs of the authentication information can be prevented automatically without awareness of print users.

Third Embodiment

In a third embodiment of the present invention, an example will be described in which an input device that starts an input last is controlled to serve as an input device that inputs authentication information. The difference between the first embodiment and the third embodiment will be mainly described below and elements having the same functions as those of the first embodiment are denoted by the same name and reference numerals as those of the first embodiment and the same descriptions will be omitted.

Figure 8:
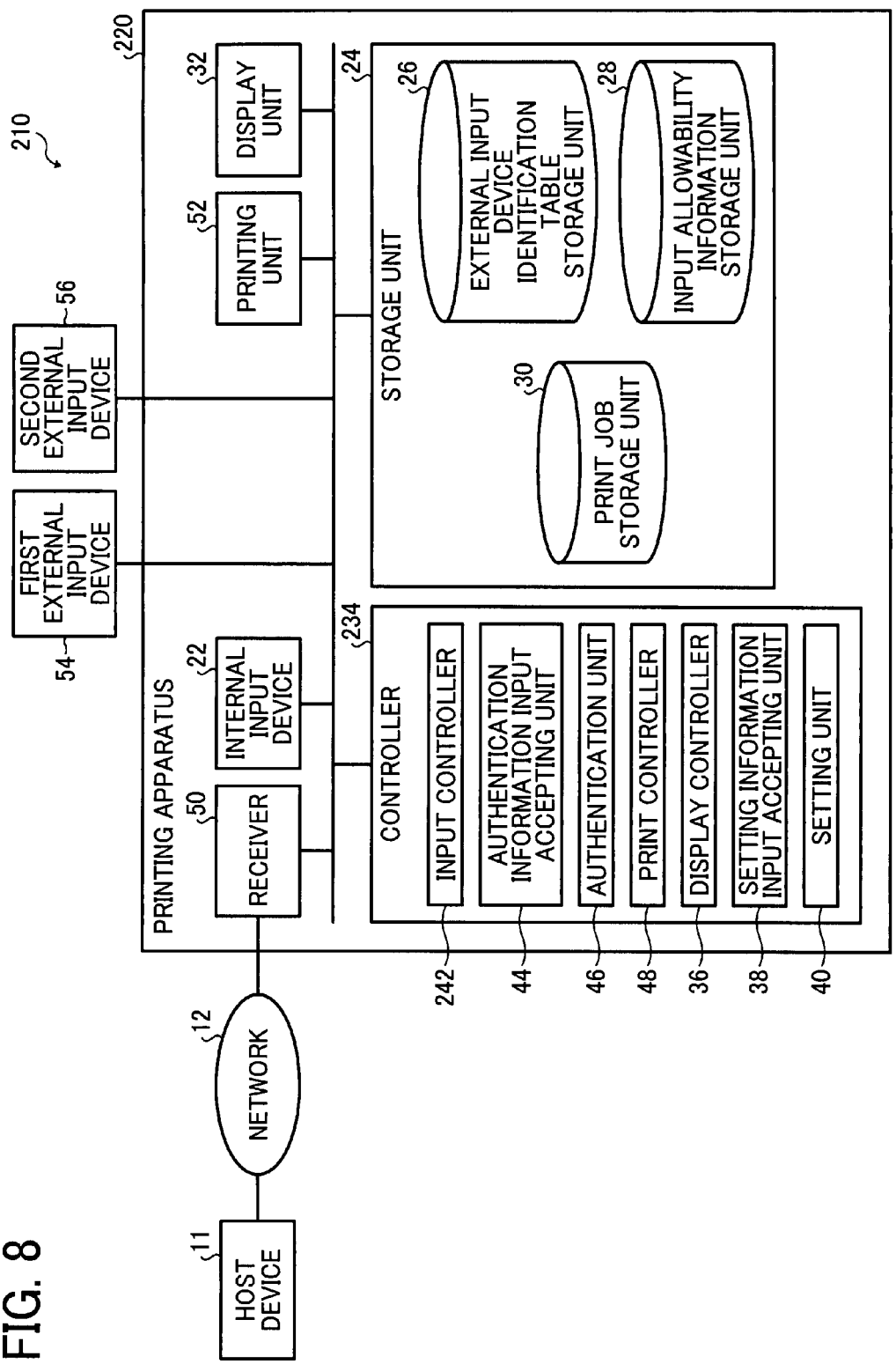
FIG. 8 is a block diagram of a configuration example of a printing system that includes a printing apparatus of a third embodiment of the present invention.

FIG. 8 is a block diagram of an example of a configuration of a printing system 210 that includes a printing apparatus 220 of the third embodiment. In the third embodiment, the contents of processes of an input controller 242 of a controller 234 are different from those of the printing apparatus 20 of the first embodiment. The input controller 242 will be described below.

Each time an input is started after the receiver 50 receives a print job, the input controller 242 controls an input device that starts an input to serve as an input device that inputs authentication information used for authenticating print user identification information.

Figure 9:
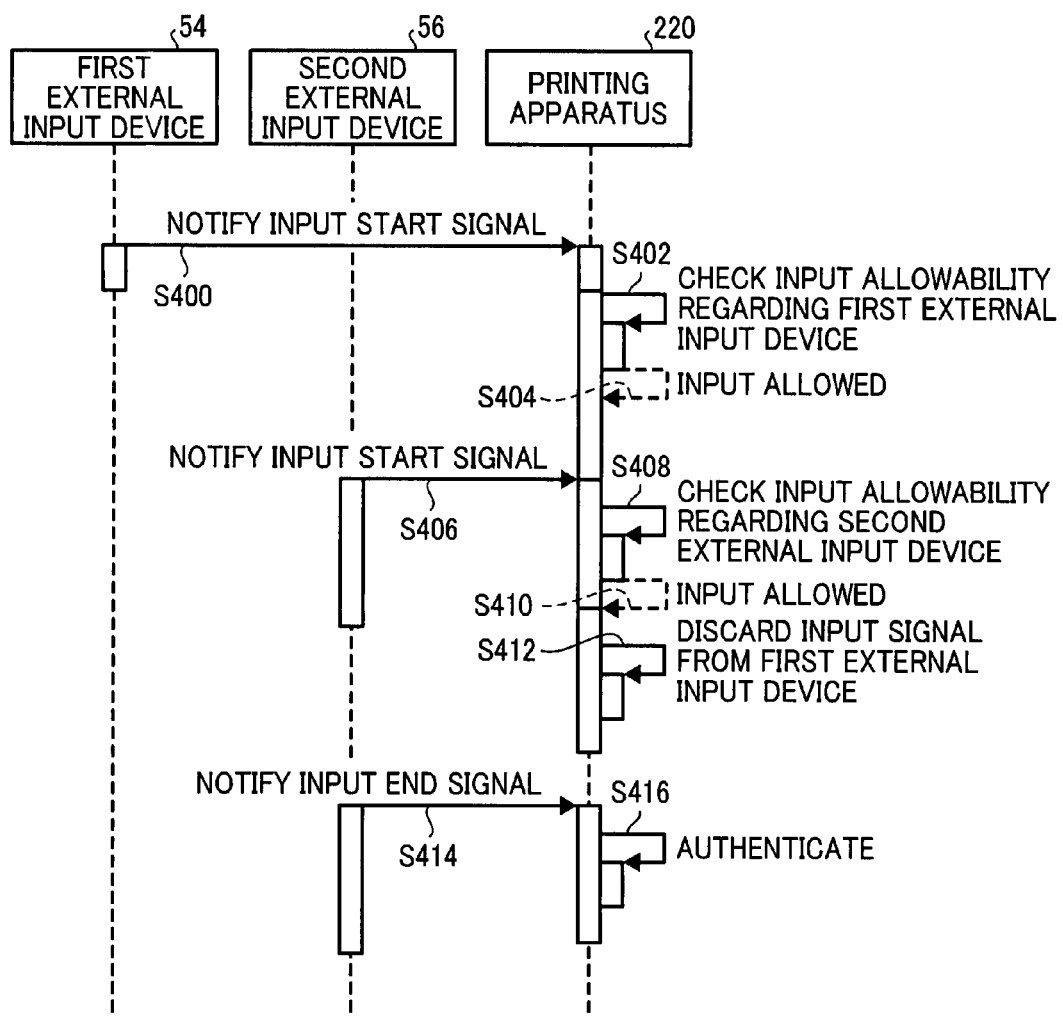
FIG. 9 is a sequence chart of a specific example of control on inputs of authentication information, which is control performed by the printing apparatus of the third embodiment.

FIG. 9 is a sequence chart of an example of a specific example of control on inputs of authentication information, which is control performed by the printing apparatus 220 of the third embodiment. The sequence chart of FIG. 9 illustrates the specific example of operations of the printing apparatus 220 after the receiver 50 receives a print job. The input allowability information storage unit 28 stores the information illustrated in FIG. 3. The printing process performed by the printing apparatus 220 is similar to that of the first embodiment and thus a description thereof will be omitted below.

The process of steps S400 to S404 is similar to that of steps S200 to S204 in the sequence chart of FIG. 5.

Upon starting an input of the authentication information, the second external input device 56 notifies the printing apparatus 220 of an input start signal (step S406).

The input controller 242 then checks the input allowability represented by the input allowability information regarding the second external input device 56, which is stored in the input allowability information storage unit 28 (step S408), and confirms that the input allowability information is set to represent that an input is allowed (step S410). Accordingly, the authentication information input accepting unit 44 accepts the input start signal that is notified by the second external input device 56 and discards an input signal of the authentication information that is notified by the first external input device 54 (step S412).

Once the second external input device 56 finishes inputting the authentication information, the second external input device 56 notifies the printing apparatus 220 of an input end signal and the authentication information input accepting unit 44 accepts the input end signal (step S414).

The authentication unit 46 authenticates the print user identification information using the authentication information that is accepted by the authentication information input accepting unit 44 (step S416).

As described above, according to the third embodiment, an input device that inputs authentication information last, out of multiple input devices that can input authentication information, is controlled to serve as an input device that inputs authentication information; therefore, while multiple input devices can input authentication information, conflict of inputs of the authentication information can be prevented. Particularly, in the third embodiment, even if authentication information is input after an input from another input device is made, the authentication information can be input in priority to the input from the other input device and conflict of inputs of the authentication information can be prevented automatically without awareness of print users.

[Modifications]

The present invention is not limited to the above-described embodiments and various modifications can be made.

[Modification 1]

For example, in the second embodiment, the priority levels may be switched according to the numbers of times the input devices are used, respectively. The difference between the second embodiment and Modification 1 will be mainly described below and elements having the same functions as those of the second embodiment are denoted by the same name and reference numerals as those of the second embodiments and the same descriptions will be omitted.

Figure 10:
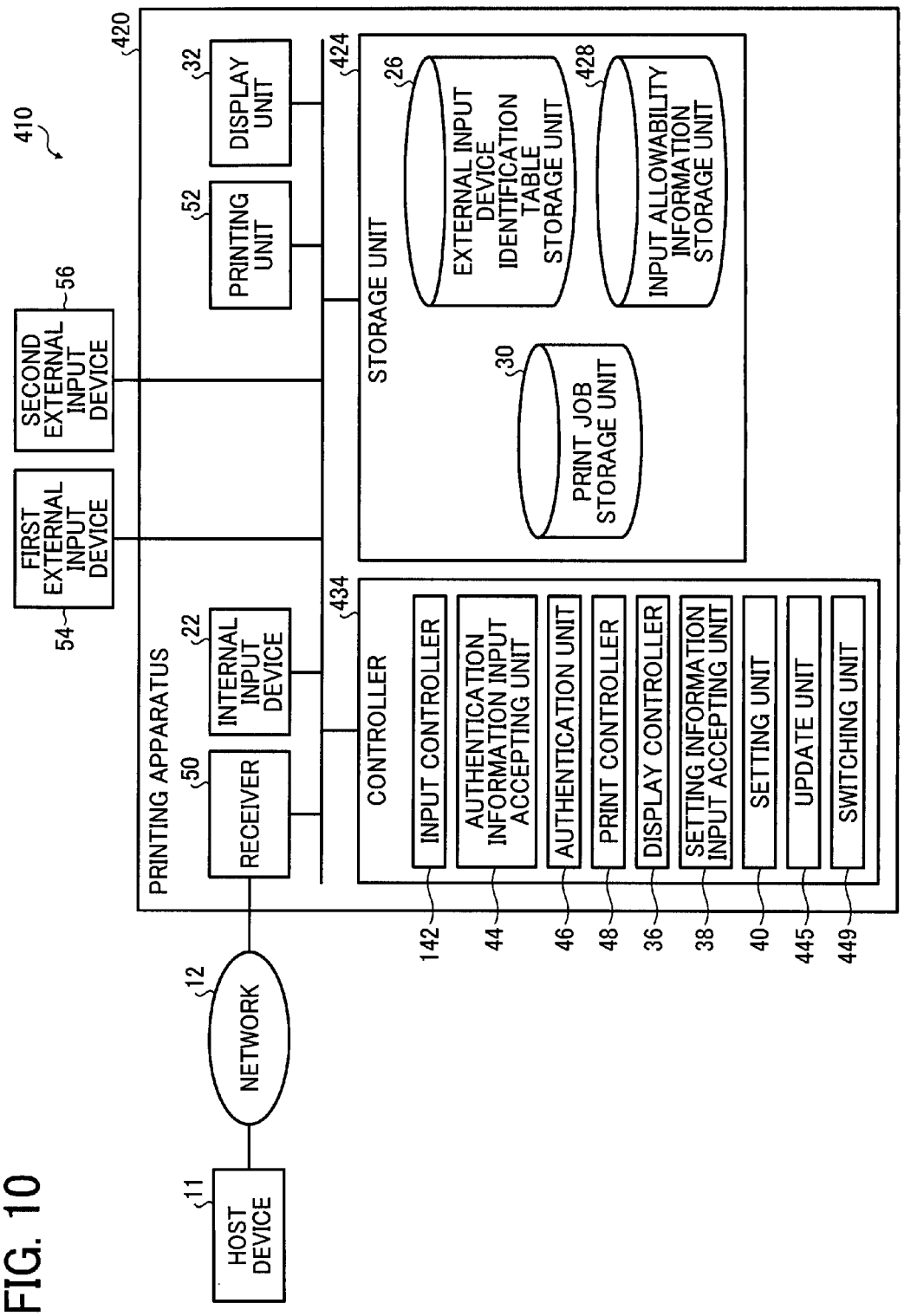
FIG. 10 is a block diagram of a configuration example of a printing system that includes a printing apparatus of Modification 1.

FIG. 10 is a block diagram of an example of a configuration of a printing system 410 that includes a printing apparatus 420 of Modification 1. In Modification 1, an input allowability information storage unit 428 of a storage unit 424 stores contents different from the storage contents in the second embodiment and a controller 434 includes an update unit 445 and a switching unit 449, which is an aspect different from that of the printing apparatus 120 of the second embodiment. The input allowability information storage unit 428, the update unit 445, and the switching unit 449 will be described below.

The input allowability information storage unit 428 further stores the numbers of times multiple input devices are used, respectively. FIG. 11 is a table of an example of information that is stored in the input allowability information storage unit 428. In the example illustrated in FIG. 11, the input allowability information storage unit 428 stores, regarding each of the multiple input devices used in the printing apparatus 420, the input allowability information, the priority level, and the number of times the input device is used in association with each other. In this example, the input allowability information regarding each of the first external input device 54 and the second external input device 56 is set to represent that an input is allowed, and the input allowability information regarding the internal input device 22 is set to represent that an input is not allowed. The priority levels of the second external input device 56, the first external input device 54, and the internal input device 22 are in the order the devices appear in this sentence. The number of times the first external input device 54 is used is 90, the number of times the second external input device 56 is used is 100, and the number of times the internal input device 22 is used is 0.

Each time the authentication information input accepting unit 44 accepts an input of the authentication information, the update unit 445 updates the number of times the input device that inputs the authentication information is used. For example, each time the authentication information input accepting unit 44 accepts an input of the authentication information, the update unit 445 increments the number of times the input device that inputs the authentication information is used.

The switching unit 449 switches between the priority levels according to the numbers of times the input devices are used. For example, when the update unit 445 increments the number of times the first external input device 54 is used and accordingly the number of times the first external input device 54 is used becomes 101 and the number of times the second external input device 56 is used is 100, the switching unit 449 sets the priority level of the first external input device 54 to be higher than the priority level of the second external input device 56. In other words, the switching unit 449 switches between the priority levels of the second external input device 56 and the first external input device 54.

As described above, according to Modification 1, the priority levels are switched according to the numbers of times the input devices are used, respectively; therefore, for example, the authentication information of the input device regarding which the number of times the input device is used is high can be input in priority to other inputs.

[Modification 2]

In Modification 1, the priority levels of a part of the input devices may be not to be switched.

In this case, it is satisfied if the input allowability information storage unit 428 further stores switching allowability information that represents whether the priority level of each of the multiple input devices is allowed to be switched. FIG. 12 is a table of an example of information that is stored in the input allowability information storage unit 428. In the example illustrated in FIG. 12, the switching allowability information regarding each of the first external input device 54 and the internal input device 22 is set to represent that switching is allowed and the switching allowability information regarding the second external input device 56 is set to represent that switching is not allowed.

The switching unit 449 may switch the priority levels regarding which the switching allowability information represents that switching is allowed according to the numbers of times the input devices are used, respectively. For example, it is assumed that the update unit 445 increments the number of times the first external input device 54 and accordingly the number of times the first external input device 54 is used becomes 101 and the number of times the second external input device 56 is used is 100. In this case, the switching allowability information is set to represent that switching is not allowed; therefore, the switching unit 449 does not switch between the priority levels of the first external input device 54 and the second external input device 56.

According to Modification 2, even if the priority levels are switched according to the numbers of times the input devices are used, respectively, the priority level of a specific input device can be fixed. For example, the priority level of the specific input device can be fixed to the highest level regardless of the frequency the input device is used.

[Modification 3]

In the second embodiment, for example, the priority levels may be switched according to the versions of the input devices. The difference between the second embodiment and Modification 3 will be mainly described below and elements having the same functions as those of the second embodiment are denoted by the same name and reference numerals as those of the second embodiments and the same descriptions will be omitted.

Figure 13:
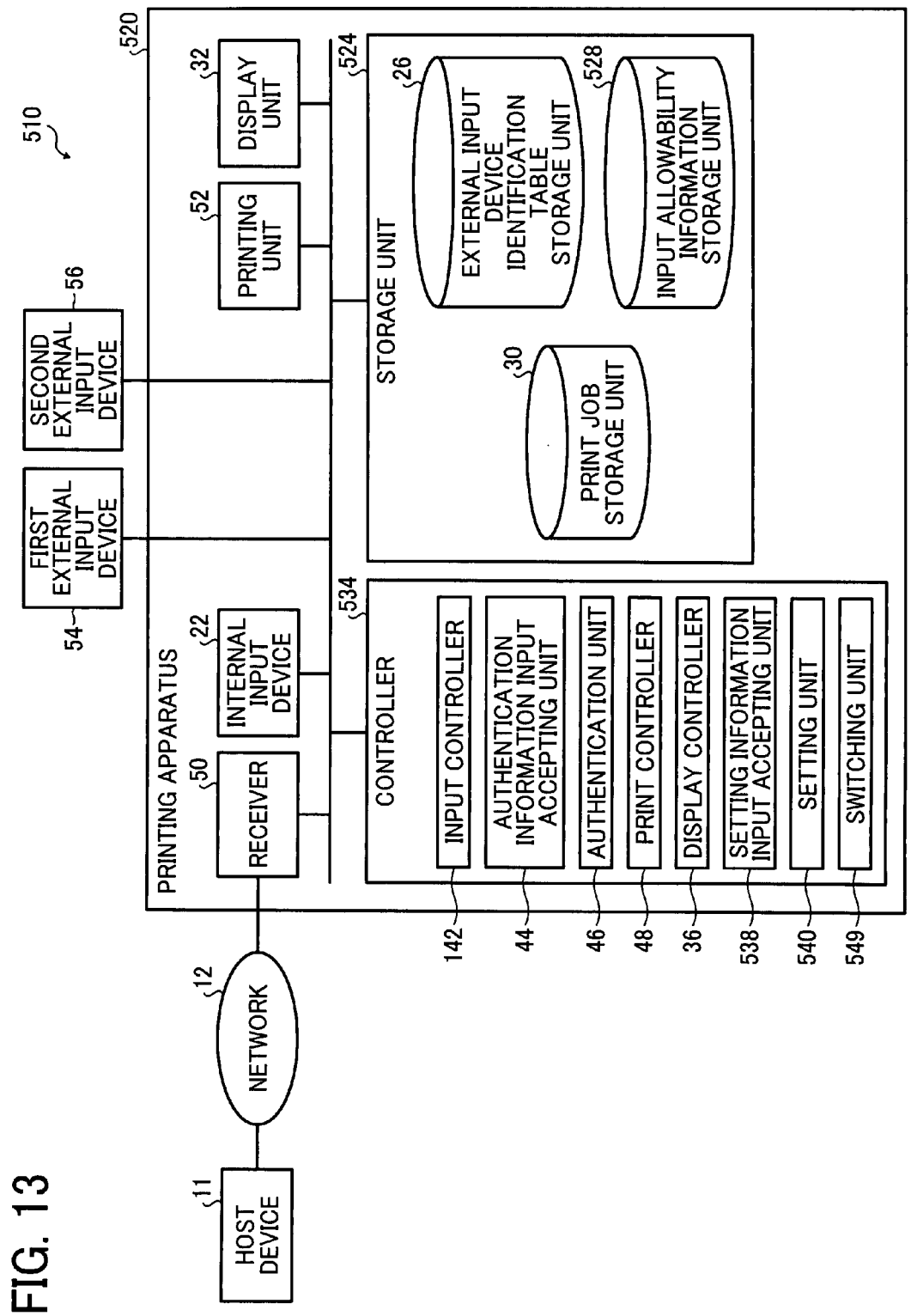
FIG. 13 is a block diagram of a configuration example of a printing system that includes a printing apparatus of Modification 3.

FIG. 13 is a block diagram of an example of a configuration of a printing system 510 that includes a printing apparatus 520 of Modification 3. In Modification 3, an input allowability information storage unit 528 of a storage unit 524 stores contents different from the storage contents in the second embodiment, a setting information input accepting unit 538 and a setting unit 540 of a controller 534 perform processes different from the processes in the second embodiment, and the controller 534 includes a switching unit 549, which is an aspect different from that of the second embodiment. The input allowability information storage unit 528, the setting information input accepting unit 538, the setting unit 540, and the switching unit 549 will be described below.

The input allowability information storage unit 528 further stores version information regarding each of the multiple input devices. FIG. 14 is a table of an example of information that is stored in the input allowability information storage unit 528. In the example illustrated in FIG. 14, the input allowability information storage unit 528 stores the input allowability information, the priority level, and the version information regarding each of the multiple input devices used in the printing apparatus 520 in association with each other. In this example, the input allowability information regarding each of the first external input device 54 and the second external input device 56 is set to represent that an input is allowed, and the input allowability information regarding the internal input device 22 is set to represent that an input is not allowed. The priority levels of the second external input device 56, the first external input device 54, and the internal input device 22 are in the order the devices appear in this sentence. The version information regarding the first external input device 54 is 2007.07, the version information regarding the second external input device 56 is 2008.01, and the version information regarding the internal input device 22 is 2006.03. In Modification 3, the version information represents the date of the release of the input device.

The setting information input accepting unit 538 accepts an input of the version information regarding each of the multiple input devices from any one of the input devices regarding which the input allowability information represents that an input is allowed.

The setting unit 540 sets the version information regarding the input devices according to the setting information that is accepted by the setting information input accepting unit 538. The setting unit 540 may set the device release numbers of the input devices as version information.

The switching unit 549 switches between the priority levels according to the version information. For example, the switching unit 549 switches between the priority levels such that a higher priority level is set if the version represented by the version information is new.

As described above, according to Modification 3, because the priority levels are switched according to the version information regarding the input devices, for example, an input device regarding which the version information represents a new version can input the authentication information in priority to other input devices.

[Modification 4]

In the Modification 3, the priority levels of a part of the input devices may be not to be switched.

In this case, it is satisfied if the input allowability information storage unit 528 further stores switching allowability information that represents whether the priority level of each of the multiple input devices is allowed to be switched. FIG. 15 is a table of an example of information that is stored in the input allowability information storage unit 528. In the example illustrated in FIG. 15, the switching allowability information regarding each of the first external input device 54 and the internal input device 22 is set to represent that switching is allowed and the switching allowability information regarding the second external input device 56 is set to represent that switching is not allowed.

The switching unit 549 may switch the priority levels regarding which the switching allowability information represents that switching is allowed according to the version information.

According to Modification 4, even if the priority levels are switched according to the version information regarding the input devices, the priority level of a specific input device can be fixed. For example, the priority level of the specific input device can be fixed to the highest level regardless of the version information.

[Modification 5]

The example in which an input device that starts an input first is controlled to serve as an input device that inputs authentication information, the example in which an input device that inputs authentication information is controlled according to the priority level of the input device that starts an input, and the example in which an input device that starts an input last is controlled to serve as an input device that inputs authentication information are described as different embodiments above. Alternatively, these examples may be realized as one embodiment. In this case, it is satisfied if a mode in which an input device that starts an input first is controlled to serve as an input device that inputs authentication information, a mode in which an input device that inputs authentication information is controlled according to the priority level of the input device that starts an input, and a mode in which an input device that starts an input last is controlled to serve as an input device that inputs authentication information are selectable on the setting screen for setting an input device that is actually used in the printing apparatus or on the setting screen for setting the input allowability and the priority level of each of the multiple input devices that are used in the printing apparatus.

[Hardware Configuration]

An example of a hardware configuration of the printing apparatus 20, 120, 220, 420, 520 of Embodiments 1 to 3 and Modifications 1 to 5 will be described below.

Figure 16:
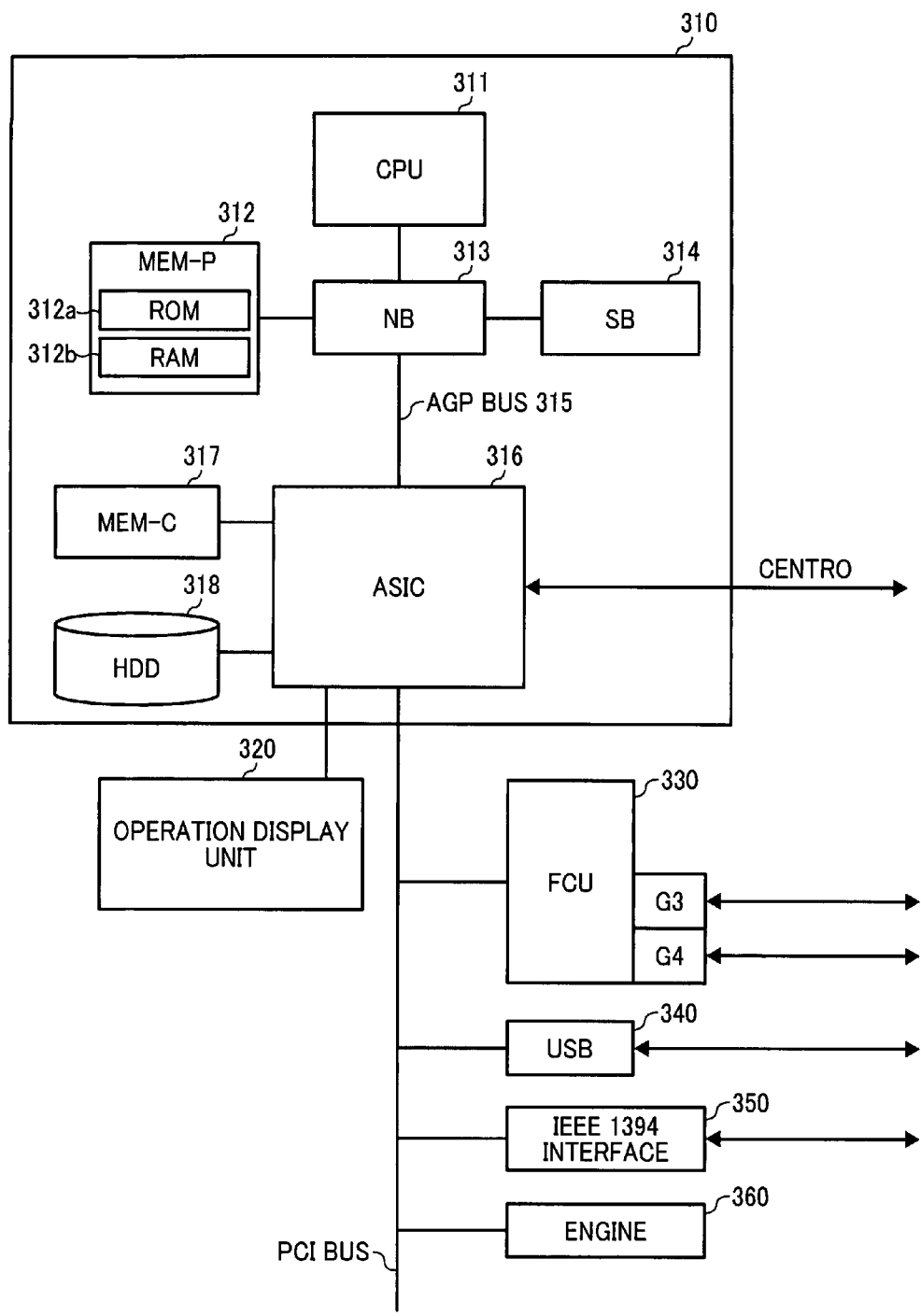
FIG. 16 is a block diagram of an example of a hardware configuration of the printing apparatus of the first to third embodiments and Modifications 1 to 5.

FIG. 16 is a block diagram of an example of the hardware configuration of the printing apparatus 20, 120, 220, 420, 520 of Embodiments 1 to 3 and Modifications 1 to 5. As shown in FIG. 16, the printing apparatus 20, 120, 220, 420, 520 of Embodiments 1 to 3 and Modifications 1 to 5 includes a controller 310 and an engine 360 that are connected to each other via a PCI (peripheral component interface) bus. The controller 310 is a controller that controls the printing apparatus 20, 120, 220, 420, 520 and controls drawing, communications, and inputs from an operation display unit 320. The engine 360 is, for example, a printer engine that is connectable to the PCI bus. For example, the engine 360 is a black/ white plotter, a single-drum color plotter, a four-drum color plotter, a scanner, or a facsimile unit. The engine 360 includes an image processing unit for error dispersion or gamma conversion in addition to a unit called an engine unit, such as a plotter.

The controller 310 includes a CPU 311, a north bridge (NB) 313, a system memory (MEP-P) 312, a south bridge (SB) 314, a local memory (MEM-C) 317, an ASIC (application specific integrated circuit) 316, and a hard disk drive (HDD) 318. The NB 313 and the ASIC 316 are connected via an AGP (accelerated graphics port) bus 315. The MEM-P 312 further includes a ROM (read only memory) 312a and a RAM (random access memory) 312b.

The CPU 311 controls the printing apparatus 20, 120, 220, 420, 520. The CPU 311 includes a chip set consisting of the NB 313, the MEM-P 312, and the SB 314 and is connected to other devices via the chip set.

The NB 313 is a bridge for connecting the CPU 311 to the MEM-P312, the SB 314, and the AGP 315 and includes a memory controller that controls writing in the MEM-P 312, a PCI master, and an AGP target.

The MEM-P 312 is a system memory used as a memory for storing programs and data, a memory for loading programs and data, or a drawing memory for a printer. The MEM-P 312 includes the ROM 312a and the RAM 312b. The ROM 312a is a read-only memory used for storing programs and data. The RAM 312b is a rewritable and readable memory used for loading programs and data and used as a drawing memory for a printer.

The SB 314 is a bridge for connecting the NB 313 to PCI devices or peripheral devices. The SB 314 is connected to the NB 313 via the PCI bus. The network interface (I/F) is also connected to the PCI bus.

The ASIC 316 is an IC (integrated circuit) for image processing that includes hardware components for image processing. The ASIC 316 serves as a bridge for connecting the AGP 315, the PCI bus, the HDD 318, and the MEM-C 317. The ASIC 316 includes a PCI target, an AGP master, an arbiter (ARB), a memory controller that controls the MEM-C 317, a plurality of DMACs (direct memory access controller) that rotates image data using a hardware logic, and a PCI unit that transfers data to the engine 360 via the PCI bus. An FCU (fax control unit) 330, a USB 340, and an IEEE 1394 (the institute of electrical and electronics engineers 1394) interface 350 are connected to the ASIC 316 via the PCI bus. The operation display unit 320 is connected directly to the ASIC 316.

The MEM-C 317 is a local memory that is used as a copy image buffer and a code buffer. The HDD 318 is a storage unit for storing image data, programs, font data, and forms.

The AGP 315 is a bus interface for a graphic accelerator card developed for accelerating graphic processes. The AGP 315 accelerates the graphic accelerator card by directly accessing the MEP-P 312 at a high throughput.

An input control program that is executed by the printing apparatus 20, 120, 220, 420, 520 of the first to third embodiments and Modifications 1 to 5 is provided as being installed in the ROM beforehand.

The input control program that is executed by the printing apparatus 20, 120, 220, 420, 520 of the first to third embodiments and Modifications 1 to 5 may be provided as being recorded in a computer-readable recording medium, such as a CD-ROM, a flexible disk (FD), a CD-R, or a DVD in a format that can be installed or in an executable format.

Furthermore, the input control program that is executed by the printing apparatus 20, 120, 220, 420, 520 of the first to third embodiments and Modifications 1 to 5 may be provided in a way that it is stored in the computer connected to a network, such as the Internet, such that it can be downloaded via the network. The input control program that is executed by the printing apparatus 20, 120, 220, 420, 520 of the first to third embodiments may be provided or distributed via a network, such as the Internet.

The input control program that is executed by the input control program that is executed by the printing apparatus 20, 120, 220, 420, 520 of the first to third embodiments may be configured as a module to realize the above-described units on the computer. As a hardware configuration, the CPU 311 reads the input control program from the ROM 312a and executes the input control program in the RAM 312b so that the above-described units are realized in the computer.

According to one of the advantages of the embodiments of the invention, each of authentication information from multiple input devices can be input, and conflict of the inputs of the authentication information can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus, comprising:
    a plurality of connecting units connected to a plurality of input units that are configured to input a plurality of authentication information including a first authentication information inputted by a first input unit of a plurality of input units and a second authentication information inputted by a second input unit of the plurality of input units;
    an authentication unit configured to perform an authentication process by using at least one of the plurality of authentication information; and
    a control unit configured to control a permission for inputting the second authentication information during a period in which the first input unit is inputting the first authentication information and the first authentication information is being authenticated.

2. The apparatus according to claim 1, wherein upon the first input unit inputting the first authentication information, the control unit does not allow the second input unit to input the second authentication information.

3. The apparatus according to claim 1, wherein upon the first input unit inputting the first authentication information, the control unit does not allow the second input unit to input the second authentication information if the second input unit is not authorized to input any authentication information.

4. The apparatus according to claim 1, wherein upon the second input unit inputting the second authentication information while the first input unit is inputting the first authentication information, the control unit receives the second authentication information from the second input unit and allows the inputting of the second authentication information if the second input unit is authorized to input an authentication information.

5. The apparatus according to claim 1, further comprising:
    a receiving unit configured to receive the plurality of authentication information from the plurality of input units via the plurality of connecting units, wherein
    upon the receiving unit receiving the first input of the first authentication information, the control unit at least one of permits and inhibits a reception of the second authentication information from the second input.

6. The apparatus according to claim 5, further comprising:
a determining unit configured to determine whether to receive the second authentication information from the second input unit while the receiving unit is receiving the first input of the authentication information from the first input unit, wherein
the control unit is configured to control the permission according the determination by the determining unit.

7. The apparatus according to claim 6, wherein the determining unit is further configured to determine whether to receive the second authentication information based on priority information assigned to the second input unit and upon the priority information indicating that the second input unit is in a high priority level, the determining unit determines to receive the second authentication information from the second input unit, and
the receiving unit receives the second authentication information from the second input unit according to the determination of the priority level by the determining unit.

8. The apparatus according to claim 7, further comprising a setting unit configured to set the priority level assigned to each of the plurality of input units.

9. The apparatus according to claim 8, wherein the setting unit is configured to dynamically perform the setting of the priority level assigned to each of the plurality of input units.

10. The apparatus according to claim 1, wherein the apparatus comprises an image forming apparatus.

11. A method, comprising:
controlling, during a period in which a first input unit of a plurality of input units inputs a first authentication information and the first authentication information is being authenticated, a permission for inputting of a second authentication information from a second input unit of the plurality of input units, at least one of the first and second authentication information being used in an authentication process, the plurality of input units being configured to connect to an apparatus via a plurality of connecting units.

12. The method according to claim 11, wherein the controlling further comprises:
rejecting the inputting of the second authentication information by the second input unit upon the first input unit inputting the first authentication information.

13. The method according to claim 11, wherein the controlling further comprises:
rejecting the inputting of the second authentication information by the second input unit upon the first input unit inputting the first authentication information and the second input unit not being authorized to input any authentication information.

14. The method according to claim 11, further comprising:
receiving the second authentication information from the second input unit while the first input unit is inputting the first authentication information, wherein the controlling further includes allowing the inputting of the second authentication information upon the second input unit being authorized to input an authentication information.

15. The method according to claim 11, further comprising:
receiving a plurality of authentication information from the plurality of input units via the plurality of connecting units, wherein upon receiving the first authentication information from the first input device, a control unit controls the receiving of the second authentication information from the second input device.

16. The method according to claim 15, further comprising:
determining whether to receive the second authentication information from the second input unit while receiving the first input of the first authentication information, wherein the control unit controls the permission based on the determining.

17. The method according to claim 16, wherein the determining includes determining whether to permit the inputting of the second authentication information from the second input unit based on priority information assigned to the second input unit and upon the priority information indicating that the second input unit is in a high priority level, and
the receiving includes receiving the input from the second input unit according to the determination of the priority level.

18. The method according to claim 17, further comprising:
setting the priority level assigned to each of the plurality of input units.

19. The method according to claim 18, wherein the setting includes dynamically setting the priority level assigned to each of the plurality of input units.

20. A non-transitory computer-readable medium including a computer-readable program product, the computer-readable program product comprising instructions, which when executed by a processor, causes the processor to perform functions including:
controlling, during a period in which a first input unit of a plurality of input units inputs a first authentication information and the first authentication information is being authenticated, a permission for inputting of a second authentication information from a second input unit of the plurality of input units, at least one of the first and second authentication information being used in an authentication process, the plurality of input units being configured to connect to an apparatus via a plurality of connecting units.

* * * * *